US012683839B2

(12) United States Patent
Kato

(10) Patent No.: US 12,683,839 B2
(45) Date of Patent: Jul. 14, 2026

(54) SIGNAL TRANSMISSION AND RECEPTION SYSTEM, RECEPTION DEVICE, AND RECEPTION METHOD

(71) Applicant: OLYMPUS MEDICAL SYSTEMS CORP., Hachioji (JP)

(72) Inventor: Shuichi Kato, Akiruno (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 201 days.

(21) Appl. No.: 18/434,966

(22) Filed: Feb. 7, 2024

(65) Prior Publication Data

US 2024/0267267 A1 Aug. 8, 2024

Related U.S. Application Data

(60) Provisional application No. 63/483,808, filed on Feb. 8, 2023.

(51) Int. Cl.
H04L 27/10 (2006.01)
H04L 7/00 (2006.01)
H04L 25/49 (2006.01)

(52) U.S. Cl.
CPC ........ H04L 25/4904 (2013.01); H04L 7/0066 (2013.01); H04L 7/0087 (2013.01)

(58) Field of Classification Search
CPC . H04L 25/4904; H04L 7/0066; H04L 7/0087; H04L 25/4906
USPC .......................................... 375/282, 333, 361
See application file for complete search history.

(56) References Cited

U.S. PATENT DOCUMENTS

| 4,361,895 | A | * | 11/1982 | Khoudari | ............ | H04L 25/4906 |
| | | | | | | 375/333 |
| 6,567,487 | B1 | * | 5/2003 | Pilz | .................... | H04L 25/4904 |
| | | | | | | 375/360 |
| 2024/0267267 | A1 | * | 8/2024 | Kato | .................... | H04L 7/0066 |

FOREIGN PATENT DOCUMENTS

| JP | 2005-4730 A | 1/2005 |
| JP | 2006-191161 A | 7/2006 |

* cited by examiner

*Primary Examiner* — Phuong Phu
(74) *Attorney, Agent, or Firm* — WHDA, LLP

(57) ABSTRACT

A signal transmission and reception system includes a transmission device configured to transmit a transmission signal, a reception device configured to receive the transmission signal, in which the transmission device includes a Manchester coding circuit that generates an encoded signal in which transmission data is converted into a Manchester code as a switching edge, as at least a part of the transmission signal on the basis of a transmission clock, and the reception device includes a high-speed clock generation circuit, an edge detection circuit configured to detect an edge of the transmission signal, and a signal detection circuit configured to detect the edge detected in a period sandwiched between a first elapsed time at which a first period has elapsed from a start point and a second elapsed time at which a second period longer than the first period has elapsed from the start point as the switching edge.

11 Claims, 6 Drawing Sheets

SIGNAL TRANSMISSION AND RECEPTION SYSTEM, RECEPTION DEVICE, AND RECEPTION METHOD

The present invention relates to a signal transmission and reception system, a reception device, and a reception method. Priority is claimed on U.S. Provisional Application No. 63/483,808, filed Feb. 8, 2023, the content of which is incorporated herein by reference.

BACKGROUND OF THE INVENTION

Field of the Invention

Description of Related Art

Conventionally, a signal transmission and reception system using a Manchester code has been used. The Manchester coded transmission signal includes a clock, and the reception device can restore a clock signal from the transmission signal. For this reason, the transmission device does not need to transmit a clock signal separately from a transmission signal.

The transmission system described in Patent Document 1 includes a phase-locked loop (PLL), and uses the PLL to restore a clock signal from a Manchester coded transmission signal.

The optical transmission system described in Patent Document 2 does not restore the clock signal from the Manchester coded transmission signal, but decodes the Manchester coded transmission signal by oversampling using a high-speed clock signal.

PATENT DOCUMENTS

[Patent Document 1] Japanese Unexamined Patent Application, First Publication No. 2005-004730
[Patent Document 2] Japanese Unexamined Patent Application, First Publication No. 2006-191161

SUMMARY OF THE INVENTION

A reception device of the signal transmission and reception system using a Manchester code may be installed in a device with limited mounting space. In this case, it is difficult to secure space for mounting a clock recovery circuit such as the PLL described in Patent Document 1. For this reason, it is desired to decode a Manchester coded transmission signal without restoring a clock signal from the Manchester coded transmission signal.

A method of decoding the Manchester coded transmission signal by oversampling, described in Patent Document 2 does not need to restore the clock signal. However, in the method described in Patent Document 2, there is a risk that the transmission accuracy may deteriorate in transmitting a transmission signal having a large amount of data due to accumulation of errors caused by oversampling.

Based on the circumstances described above, an object of the present invention is to more accurately decode a Manchester coded transmission signal without restoring a clock signal from the Manchester coded transmission signal.

In order to solve the problems described above, the present invention proposes the following means.

A signal transmission and reception system according to a first aspect of the present invention includes a transmission device configured to transmit a transmission signal, and a reception device configured to receive the transmission signal, in which the transmission device includes a Manchester coding circuit that generates an encoded signal in which transmission data is converted into a Manchester code as a switching edge, as at least a part of the transmission signal on the basis of a transmission clock, and the reception device includes a high-speed clock generation circuit configured to generate a high-speed clock faster than the transmission clock, an edge detection circuit configured to detect an edge of the transmission signal on the basis of the high-speed clock, and a signal detection circuit configured to detect the edge detected in a period sandwiched between a first elapsed time at which a first period has elapsed from a start point and a second elapsed time at which a second period longer than the first period has elapsed from the start point as the switching edge.

A reception device according to a second aspect of the present invention is a reception device that receives a transmission signal including an encoded signal in which transmission data is converted into a Manchester code as a switching edge from a transmission device on the basis of a transmission clock, and includes a high-speed clock generation circuit configured to generate a high-speed clock faster than the transmission clock, an edge detection circuit configured to detect an edge of the transmission signal on the basis of the high-speed clock, a signal detection circuit configured to detect the edge detected in a period sandwiched between a first elapsed time at which a first period has elapsed from a start point and a second elapsed time at which a second period longer than the first period has elapsed from the start point as the switching edge.

A reception method according to a third aspect of the present invention is a reception method for receiving a transmission signal including an encoded signal in which transmission data is converted into a Manchester code as a switching edge from a transmission device on the basis of a transmission clock, and includes a high-speed clock generation process of generating a high-speed clock faster than the transmission clock, an edge detection process of detecting an edge of the transmission signal on the basis of the high-speed clock, and a signal detection process of detecting the edge detected in a period sandwiched between a first elapsed time at which a first period has elapsed from a start point and a second elapsed time at which a second period longer than the first period has elapsed from the start point as the switching edge.

The transmission and reception system, the reception device, and the reception method according to the present invention can decode the Manchester coded transmission signal with higher accuracy without restoring a clock signal from the Manchester coded transmission signal.

BRIEF DESCRIPTION OF THE DRAWINGS

FIG. 3 is a timing chart which shows an operation of a signal detection circuit.

DETAILED DESCRIPTION OF THE INVENTION

First Embodiment

Figure 1:
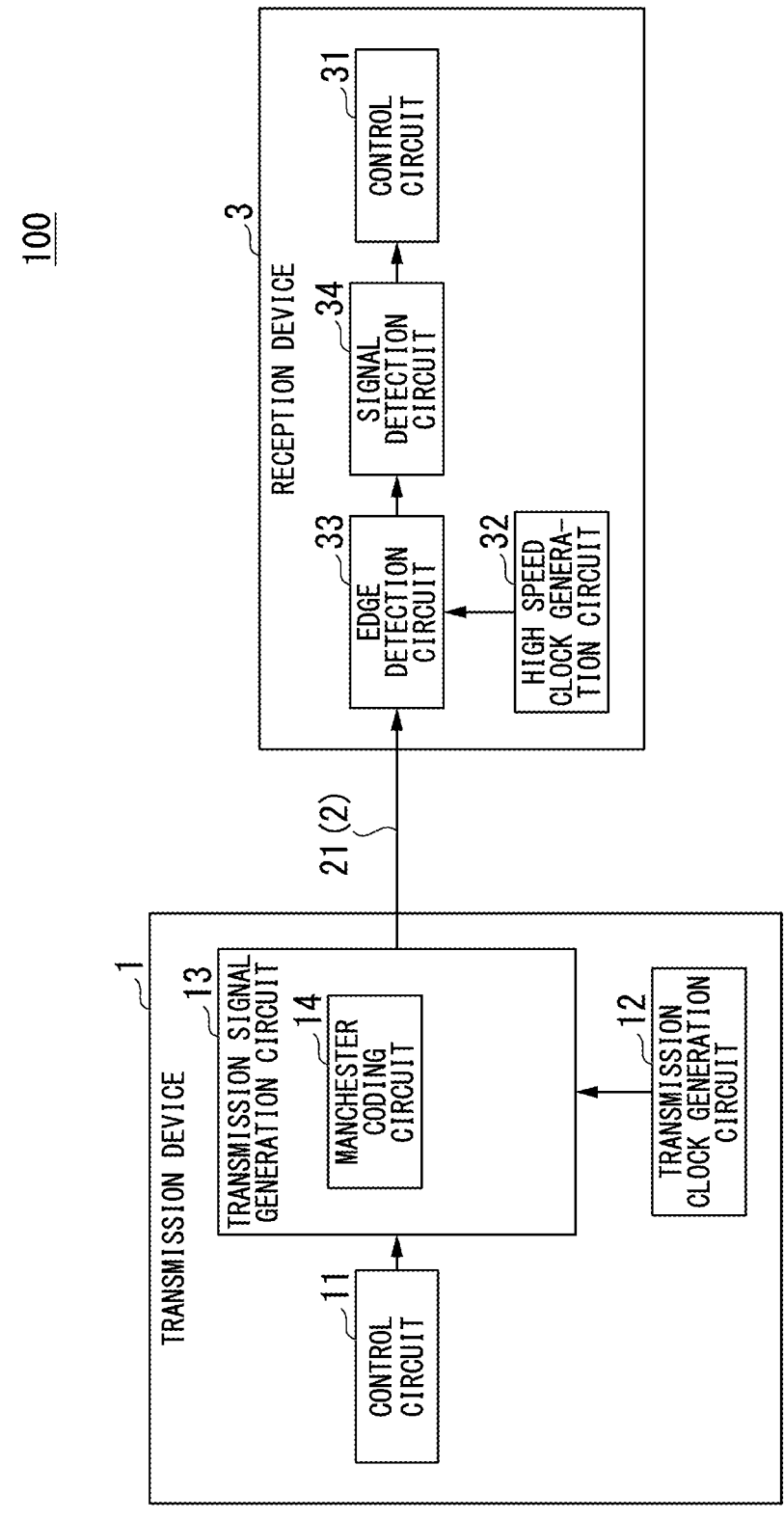
FIG. 1 is a block diagram of a signal transmission and reception system according to a first embodiment.

A first embodiment of the present invention will be described with reference to FIGS. 1 to 3. FIG. 1 is a block diagram of a signal transmission and reception system 100 according to the present embodiment.

[Signal Transmission and Reception System 100]

The signal transmission and reception system 100 includes a transmission device 1, a transmission cable 2, and a reception device 3. The reception device 3 is installed in a device with limited mounting space, such as an edge device and a small embedded device. For this reason, it is desirable that the reception device 3 be small, and it is desirable that the number of transmission cables 2 be small.

The transmission device 1 includes a control circuit 11, a transmission clock generation circuit 12, and a transmission signal generation circuit 13.

The control circuit 11 collectively controls an entirety of the transmission device 1. In addition, the control circuit 11 controls peripheral devices connected to the transmission device 1. The control circuit 11 outputs data to be transmitted to the reception device 3 to the transmission signal generation circuit 13.

The transmission clock generation circuit 12 generates a transmission clock with a clock cycle T. The transmission clock is output to the transmission signal generation circuit 13.

The transmission signal generation circuit 13 generates a transmission signal to be transmitted to the reception device 3. In the present embodiment, the transmission signal generation circuit 13 includes a Manchester coding circuit 14.

Figure 2:
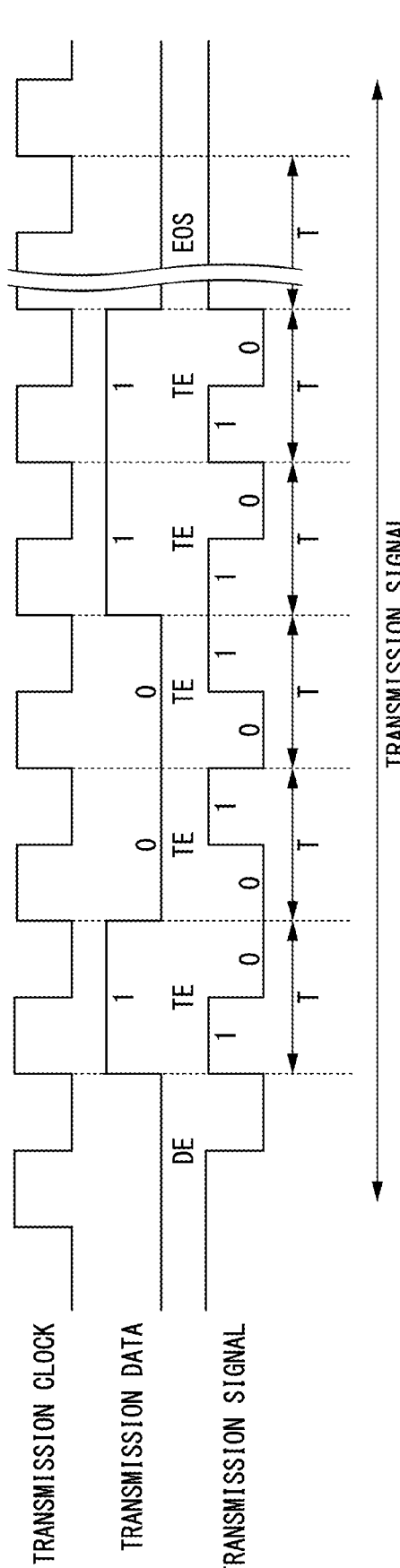
FIG. 2 is a timing chart which shows an encoded signal converted into Manchester code.

FIG. 2 is a timing chart which shows a Manchester encoded signal.

The Manchester coding circuit 14 converts (encodes) transmission data received from the control circuit 11 into a Manchester code. The Manchester encoded signal is a signal that is synchronized with the transmission clock. The Manchester coding circuit 14 generates a Manchester encoded signal as at least a part of the transmission signal.

For example, as shown in FIG. 2, the Manchester coding circuit 14 generates a Manchester encoded signal by performing an exclusive NOR operation on the transmission clock and the serialized transmission data. In the Manchester encoded signal, a switching edge (a transition edge) TE occurs in a middle of a clock cycle T (a falling edge of the transmission clock). The switching edge TE is an edge (phase) in which transmission data is converted into a Manchester code. When the transmission data is "1," the switching edge TE is an edge (a falling edge) at which a signal level changes from High to Low. When the transmission data is "0," the switching edge TE is an edge (a rising edge) at which the signal level changes from Low to High.

The Manchester coding circuit 14 may generate a Manchester encoded signal by performing an exclusive OR operation on the transmission clock and the serialized transmission data. In this case, when the transmission data is "1," the switching edge TE is an edge (a rising edge) at which the signal level changes from Low to High. When the transmission data is "0," the switching edge TE is an edge (a falling edge) at which the signal level changes from High to Low.

The Manchester coding circuit 14 generates a dummy edge DE that transitions in the middle of the clock cycle T (at a falling edge of the transmission clock), like the switching edge TE, at the beginning of the Manchester encoded signal. The dummy edge DE exemplified in FIG. 2 is an edge (a falling edge) at which the signal level transitions from High to Low. The dummy edge DE may be an edge (a rising edge) at which the signal level changes from Low to High.

The Manchester coding circuit 14 generates a final signal (EOS) in which the encoded signal does not transition in the middle of the clock cycle T and there is no switching edge TE in the clock cycle T at an end of the Manchester encoded signal. The final signal is one of a first final signal in which the signal level of the encoded signal remains High and does not transition to Low in the clock cycle T, and a second final signal in which the signal level of the encoded signal remains Low and does not transition to High in the clock cycle T.

The transmission signal generation circuit 13 may use two types of final signals (a first final signal and a second final signal) as a single logic signal. The transmission signal generation circuit 13 can use, for example, the final signal (EOS) encoded as a single logic signal that indicates "true" when the final signal is the first final signal and indicates "false" when the final signal is the second final signal. The transmission signal generation circuit 13 can use, for example, a final signal (EOS) in which an ACK signal, a parity bit, and the like are encoded as a single logic signal.

The transmission cable 2 connects the transmission device 1 and the reception device 3. The transmission cable 2 includes a transmission signal line 21 and a power signal line (not shown).

The reception device 3 includes a control circuit 31, a high-speed clock generation circuit 32, an edge detection circuit 33, and a signal detection circuit 34.

The control circuit 31 collectively controls an entirety of the reception device 3. In addition, the control circuit 31 controls peripheral devices connected to the reception device 3. Received data detected by the signal detection circuit 34 is input to the control circuit 31.

The control circuit 31 has a parameter register that records a first period t1 and a second period t2. The first period t1 is a period from the switching edge TE to before a next switching edge TE and before the encoded signal is transitioned by the switching edge TE. Specifically, the first period t1 is a period of 0.6T to 0.9T with respect to the clock cycle T of the transmission clock, and is preferably a period of about 0.75T. The second period t2 is a period from the switching edge TE to after the next switching edge TE and after the encoded signal is transitioned by the switching edge TE. Specifically, the second period t2 is a period of 1.1T to 1.4T with respect to the clock cycle T of the transmission clock, and is preferably a period of about 1.25T. The first period t1 and the second period t2 may be defined by a length of time, or may be defined by the number of high-speed clocks.

The high-speed clock generation circuit 32 generates a high-speed clock that is sufficiently faster than the transmission clock. The high-speed clock is not synchronized with the transmission clock. Note that the high-speed clock may be synchronized with the transmission clock. The high-speed clock may be any clock that is fast enough to detect an edge of the transmission signal, for example, a clock that is approximately 5 to 20 times faster than the transmission clock. The high-speed clock generation circuit 32 outputs a high-speed clock to the edge detection circuit 33 and the signal detection circuit 34.

The edge detection circuit 33 detects edges including the dummy edge DE and the switching edge TE from the transmission signal received via the transmission signal line 21 by using a high-speed clock. The edge detection circuit 33 outputs the detected edge to the signal detection circuit 34.

Figure 3:
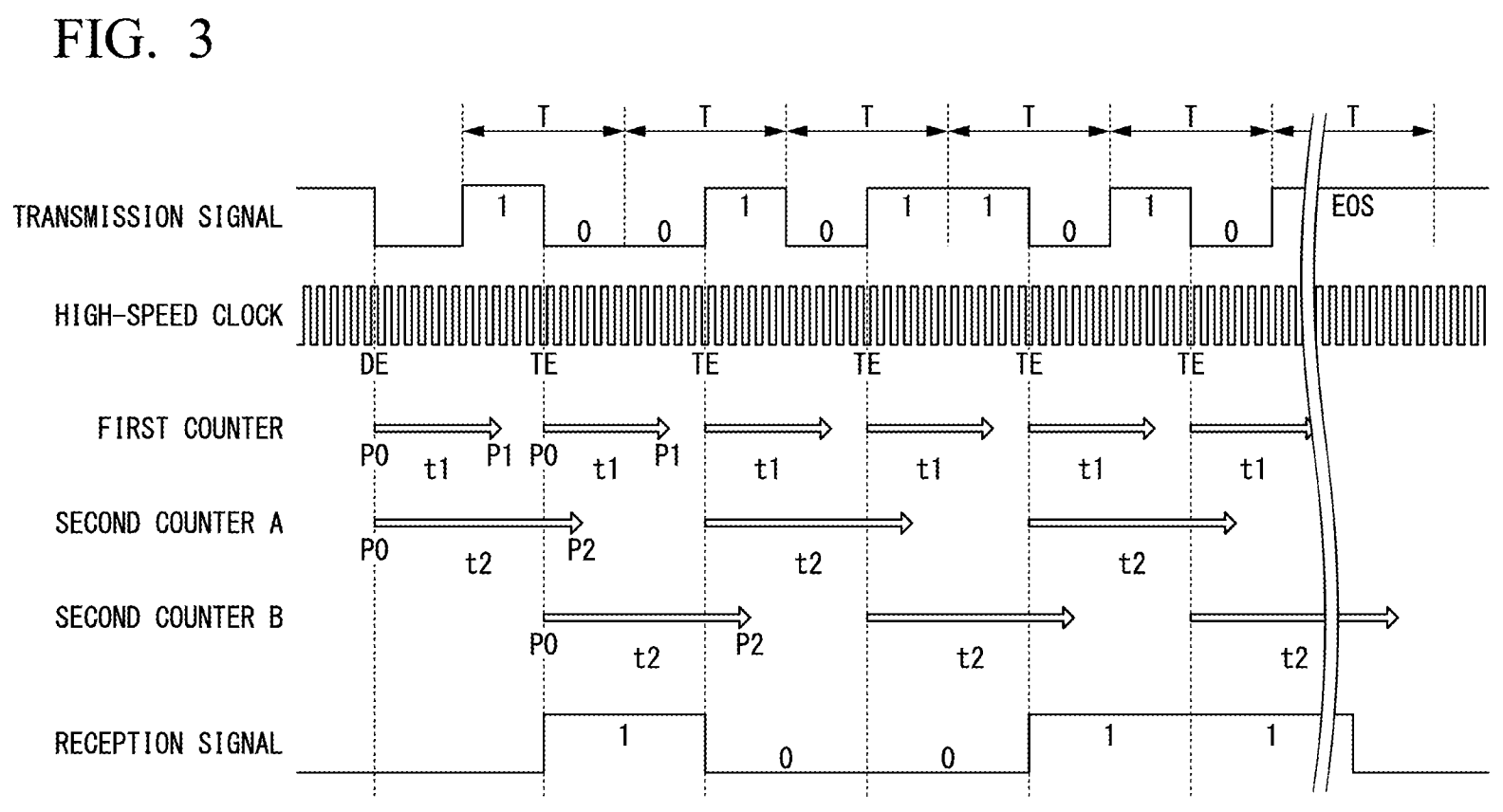

FIG. 3 is a timing chart which shows an operation of the signal detection circuit 34.

The signal detection circuit 34 detects a transmission signal on the basis of an edge detected by the signal detection circuit 34. The signal detection circuit 34 has a first counter and a second counter. The first counter and the second counter are counters that operate in synchronization with the high-speed clock.

The signal detection circuit 34 uses the dummy edge DE, which is a first edge, as a start point P0, and causes the first counter to count up to detect a first elapsed time P1 at which the first period t1 has elapsed. The signal detection circuit 34 uses the dummy edge DE, which is the first edge, as the start point P0, and causes the second counter to count up to detect a second elapsed time P2 at which the second period t2 (t2>t1) has elapsed. The signal detection circuit 34 determines that an edge detected in a period sandwiched between the first elapsed time P1 and the second elapsed time P2 is a switching edge TE. The signal detection circuit 34 detects a first transmission signal as "1" when the signal level of the transmission signal at the first elapsed time P1 is High and the signal level of the transmission signal at the second elapsed time P2 is Low, and outputs "1" as received data. The signal detection circuit 34 detects the first transmission signal as "0" and outputs "0" as received data when the signal level of the transmission signal at the first elapsed time P1 is Low and the signal level of the transmission signal at the second elapsed time P2 is High.

The signal detection circuit 34 uses the detected switching edge TE as the start point P0, and causes the first counter to count up to detect the first elapsed time P1 at which the first period t1 has elapsed. The signal detection circuit 34 uses the detected switching edge TE as the start point P0, and causes the second counter to count up to detect the second elapsed time P2 at which the second period t2 has elapsed. The signal detection circuit 34 determines that an edge detected in a period sandwiched between the first elapsed time P1 and the second elapsed time P2 is the switching edge TE. The signal detection circuit 34 detects the transmission signal as "1" and outputs "1" as received data when the signal level of the transmission signal at the first elapsed time P1 is High and the signal level of the transmission signal at the second elapsed time P2 is Low. When the signal level of the transmission signal at the first elapsed time P1 is Low and the signal level of the transmission signal at the second elapsed time P2 is High, the signal detection circuit 34 detects the transmission signal as "0" and outputs "0" as received data.

As shown in FIG. 3, the second period t2 detected by the signal detection circuit 34 partially overlaps. For this reason, the signal detection circuit 34 has two second counters (a second counter A and a second counter B).

The signal detection circuit 34 continues decoding the transmission signal with the switching edge TE set as the start point P0 until it detects the final signal (EOS). When the signal detection circuit 34 detects the final signal (EOS), it ends the decoding processing of the transmission signal.

It is desirable that the first period t1 be set such that a transmission signal received via the transmission signal line 21 is sufficiently stable at the first elapsed time P1. It is desirable that the second period t2 be set such that the transmission signal received via the transmission signal line 21 is sufficiently stable at the second elapsed time P2.

Note that the Manchester coding circuit 14 does not need to generate the dummy edge DE. By the transmission device 1 inserting dummy data at the beginning of the transmission data, the reception device 3 can use the first switching edge TE as the dummy edge DE.

According to the signal transmission and reception system 100 according to the present embodiment, a Manchester encoded signal can be decoded with higher accuracy without restoring a transmission clock from the Manchester encoded signal. The signal transmission and reception system 100 can decode a transmission signal on the basis of the signal levels of the transmission signal at the first elapsed time P1 and the second elapsed time P2 measured using the dummy edge DE or switching edge TE as the start point P0 even without using a transmission clock. In addition, it can decode a transmission signal with high accuracy by minimizing an accumulation of errors caused by the transmission clock and high-speed clock being asynchronous with each other to decode a next transmission signal using the switching edge TE detected immediately before as the start point P0.

Although the first embodiment of the present invention has been described above in detail with reference to the drawings, a specific configuration is not limited to the present embodiment, and design changes may be made within a range not departing from the gist of the present invention. Moreover, the components shown in the embodiments described above and modifications thereof can be configured by appropriately combining them.

Second Embodiment

A signal transmission and reception system 100B according to a second embodiment of the present invention will be described with reference to FIGS. 4 to 5. In the following description, components that are common to those already described will be given the same reference numerals and redundant description will be omitted.

Figure 4:
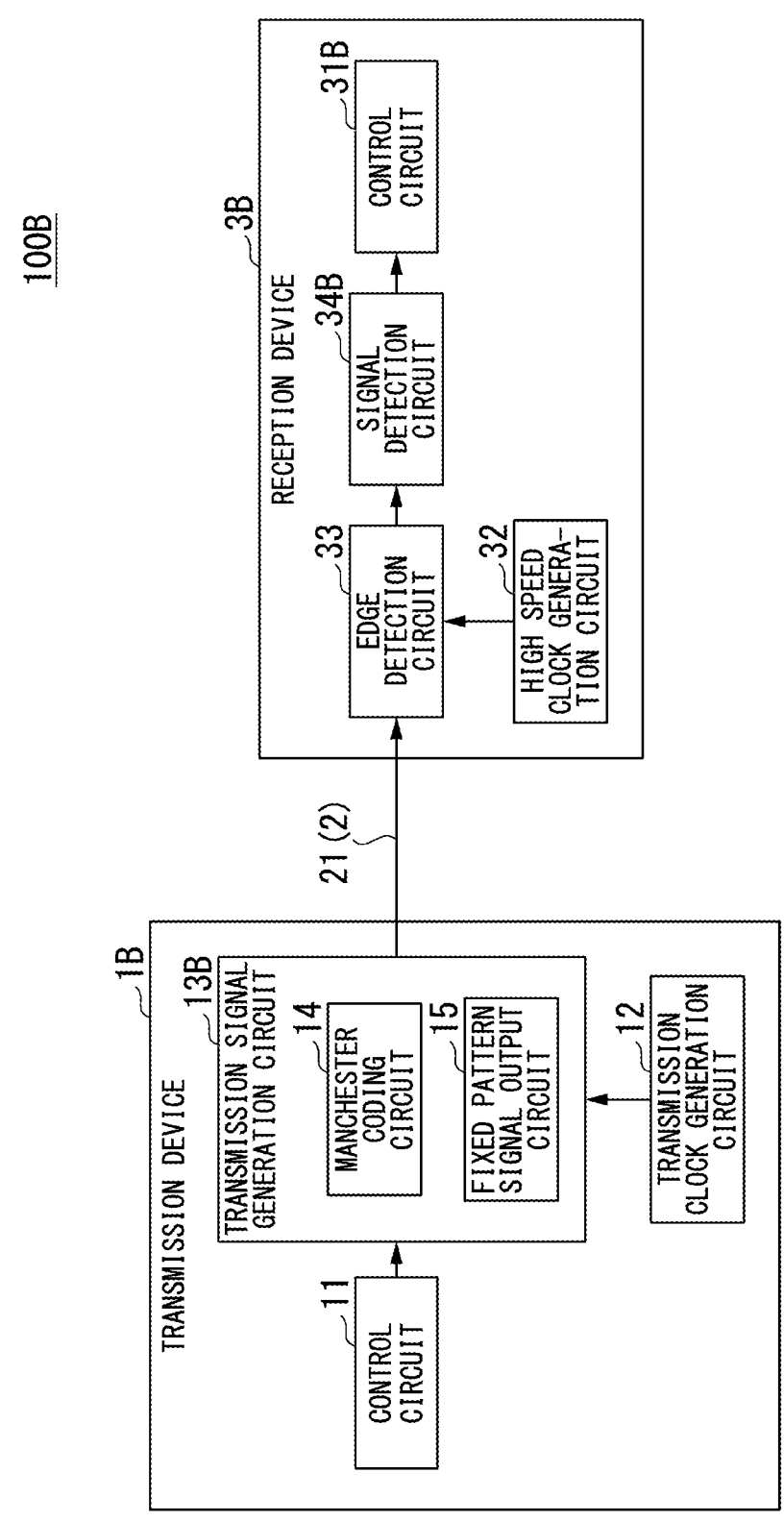
FIG. 4 is a block diagram of a signal transmission and reception system according to a second embodiment.

FIG. 4 is a block diagram of the signal transmission and reception system 100B.

The signal transmission and reception system 100B includes a transmission device 1B, a transmission cable 2, and a reception device 3B. The reception device 3B is installed in a device with limited mounting space, such as an edge device and a small embedded device. For this reason, it is desirable that the reception device 3B be small, and it is desirable that the number of transmission cables 2 be small.

The transmission device 1B includes a control circuit 11, a transmission clock generation circuit 12, and a transmission signal generation circuit 13B.

The transmission signal generation circuit 13B generates a transmission signal to be transmitted to the reception device 3B. In the present embodiment, the transmission signal generation circuit 13B includes a Manchester coding circuit 14 and a fixed pattern signal output circuit 15.

Figure 5:
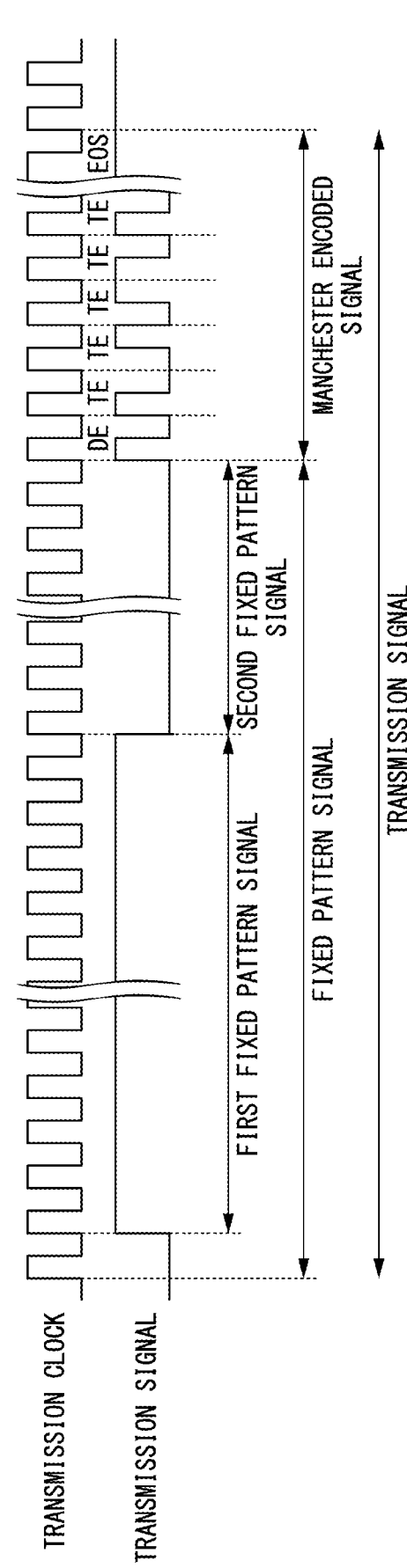
FIG. 5 is a timing chart which shows a transmission signal generated by a transmission signal generation circuit.

FIG. 5 is a timing chart which shows a transmission signal generated by the transmission signal generation circuit 13B. The fixed pattern signal output circuit 15 generates a fixed pattern signal that is added, as a part of the transmission signal, in front of the encoded signal generated by the Manchester coding circuit 14. The fixed pattern signal includes a first fixed pattern signal whose signal level is high in a reference period T1, and a second fixed pattern signal whose signal level is low after the first fixed pattern signal.

The reference period T1 is a period that is a real number times (Nb times) the first period t1, and a period that is a real number times (Na times) the second period t2.

The reception device 3B includes a control circuit 31B, a high-speed clock generation circuit 32, an edge detection circuit 33, and a signal detection circuit 34B.

The control circuit 31B collectively controls an entirety of the reception device 3B. In addition, the control circuit 31B controls peripheral devices connected to the reception device 3B. The received data detected by the signal detection circuit 34B is input to the control circuit 31B. The control circuit 31B differs from the control circuit 31 of the first embodiment in that it does not have a parameter register for recording the first period t1 and the second period t2.

In addition to a function of the signal detection circuit 34 of the first embodiment, the signal detection circuit 34B has a function of calculating the first period t1 based on the first fixed pattern signal. The signal detection circuit 34B has a third counter that operates in synchronization with a high-speed clock. On the basis of an edge of the first fixed pattern signal detected by the edge detection circuit 33, the signal detection circuit 34B uses the third counter to count the number of clocks P of the high-speed clock in the reference period T1 in which the signal level of the first fixed pattern signal is High. The signal detection circuit 34B calculates the first period t1 represented by the number of clocks of the high-speed clock by dividing the number of clocks P by a constant Nb (t1=P/Nb). The signal detection circuit 34B calculates the second period t2 represented by the number of clocks of the high-speed clock by dividing the number of clocks P by a constant Na (t2=P/Na). The signal detection circuit 34B reduces errors caused by the division by calculating the first period t1 and the second period t2 independently based on the number of clocks P.

A length of the period of the second fixed pattern signal is longer than a period required for the signal detection circuit 34B to calculate the first period t1 and the second period t2 on the basis of the number of clocks P. The signal detection circuit 34B can secure an operation period for calculating the first period t1 and the second period t2.

The signal detection circuit 34B decodes the transmission signal on the basis of the calculated first period t1 and second period t2, as in the first embodiment.

Even when the transmission device 1B performs intermittent transfer such as changing the frequency of the transmission clock for each transmission signal, the reception device 3B can calculate the first period t1 and the second period t2 based on a fixed pattern signal for each intermittent transfer, and properly decode a transmission signal.

Since the transmission clock and the high-speed clock are asynchronous with each other, the first period t1 and the second period t2 calculated by the signal detection circuit 34B may include an error. However, the signal transmission and reception system 100B can decode a transmission signal with high accuracy by minimizing an accumulation of errors caused by the transmission clock and the high-speed clock being asynchronous with each other to decode a next transmission signal using the switching edge TE detected immediately before as the start point P0, like the signal transmission and reception system 100 of the first embodiment.

The first fixed pattern signal does not need to be a one-pulse signal. The first fixed pattern signal may be a predetermined pattern signal as long as it can determine the reference period T1. The first fixed pattern signal may be, for example, a signal composed of a plurality of pulses.

According to the signal transmission and reception system 100B of the present embodiment, a Manchester coded transmission signal can be decoded with higher accuracy without restoring the transmission clock from the Manchester coded transmission signal. The first period t1 and the second period t2 can be calculated based on a fixed pattern signal included in a transmission signal even though the first period t1 and the second period t2 are not fixed in advance.

Although the second embodiment of the present invention has been described above in detail with reference to the drawings, a specific configuration is not limited to the present embodiment, and design changes may be made within a range not departing from the gist of the present invention. Moreover, the components shown in the embodiments described above and modifications thereof can be configured by appropriately combining them.

Third Embodiment

A signal transmission and reception system 100C according to a third embodiment of the present invention will be described with reference to FIG. 6. In the following description, components that are common to those already described will be given the same reference numerals and redundant description will be omitted.

Figure 6:
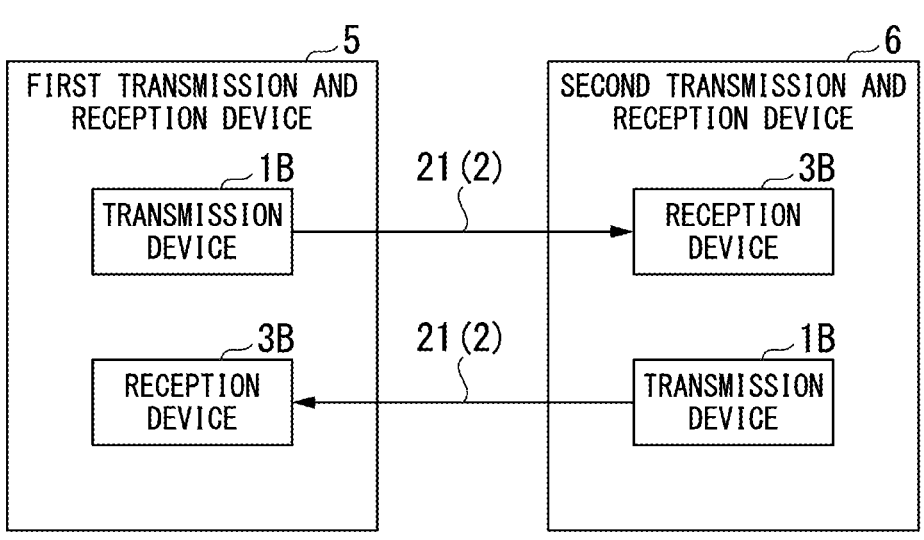
FIG. 6 is a block diagram of a signal transmission and reception system according to a third embodiment.

FIG. 6 is a block diagram of the signal transmission and reception system 100C.

The signal transmission and reception system 100C includes a first transmission and reception device 5, a second transmission and reception device 6, and a transmission cable 2. The first transmission and reception device 5 and the second transmission and reception device 6 include the transmission device 1B and the reception device 3B. The first transmission and reception device 5 and the second transmission and reception device 6 are capable of transmitting and receiving data to and from each other. The first transmission and reception device 5 and the second transmission and reception device 6 can change the transmission clock within a predetermined range.

The first transmission and reception device 5 can transmit a request to change a data rate in a transmission signal received from the second transmission and reception device 6, that is, a frequency of a transmission clock of the transmission device 1B of the second transmission and reception device 6 to the second transmission and reception device 6. For example, the second transmission and reception device 6 transmits a request to lower the data rate to the first transmission and reception device 5 when there is no room for decoding processing and the data rate in the transmission signal received from the first transmission and reception device 5 is intended to be lowered.

The second transmission and reception device 6 can transmit a request to change a data rate in a transmission signal received from the first transmission and reception device 5, that is, a frequency of a transmission clock of the transmission device 1B of the first transmission and reception device 5 to the first transmission and reception device 5. For example, the second transmission and reception device 6 transmits a request to lower the data rate to the second transmission and reception device 6 when there is room for decoding processing and the data rate in the transmission signal received from the first transmission and reception device 5 is intended to be increased.

The transmission device 1B may use the final signal (EOS) in which a change request of the data rate is encoded as a single logical signal.

According to the signal transmission and reception system 100C of the present embodiment, a Manchester coded transmission signal can be decoded with higher accuracy without restoring a transmission clock from the Manchester coded transmission signal. The first transmission and reception device 5 and the second transmission and reception device 6 do not need to fix the first period t1 and the second period t2 in advance, as in the second embodiment. For this reason, the first transmission and reception device 5 and the second transmission and reception device 6 tend to request a transmitting side to change the data rate (the frequency of a transmission clock) so that they can each receive the transmission signal at an optimal data rate.

Although the third embodiment of the present invention has been described above in detail with reference to the drawings, a specific configuration is not limited to the present embodiment, and design changes may be made within a range not departing from the gist of the present invention. Moreover, the components shown in the embodiments and modifications described above can be configured by appropriately combining them.

The present invention can be applied to transmission and reception devices that use Manchester codes.

What is claimed is:

1. A signal transmission and reception system comprising:
   a transmission device configured to transmit a transmission signal; and
   a reception device configured to receive the transmission signal,
   wherein the transmission device includes a Manchester coding circuit that generates an encoded signal in which transmission data is converted into a Manchester code as a switching edge, as at least a part of the transmission signal on the basis of a transmission clock, and
   the reception device includes
   a high-speed clock generation circuit configured to generate a high-speed clock faster than the transmission clock,
   an edge detection circuit configured to detect an edge of the transmission signal on the basis of the high-speed clock, and
   a signal detection circuit configured to detect the edge detected in a period sandwiched between a first elapsed time at which a first period has elapsed from a start point and a second elapsed time at which a second period longer than the first period has elapsed from the start point as the switching edge,
   wherein the signal detection circuit has a first counter and a second counter that operate in synchronization with the high-speed clock, detects the first elapsed time at which the first period has elapsed from the start point using the first counter, and detects the second elapsed time at which the second period has elapsed from the start point using the second counter.

2. The signal transmission and reception system according to claim 1,
   wherein the signal detection circuit detects a next switching edge using the switching edge detected immediately before as the start point.

3. The signal transmission and reception system according to claim 1,
   wherein the Manchester coding circuit adds a dummy edge, which the signal detection circuit uses as an initial start point, to a beginning of the encoded signal.

4. The signal transmission and reception system according to claim 1, wherein the Manchester coding circuit adds a final signal without the switching edge in a clock cycle of the transmission clock to an end of the encoded signal, and
   the Manchester coding circuit uses one of a first final signal that is the final signal and has a high signal level and a second final signal that is the final signal and has a low signal level as a single logic signal.

5. The signal transmission and reception system according to claim 1,
   wherein the transmission device further includes a fixed pattern signal output circuit that outputs a first fixed pattern signal that is a predetermined pattern signal in a reference period as a part of the transmission signal in front of the encoded signal, and
   the signal detection circuit counts the number of clocks of the high-speed clock in a period in which the first fixed pattern signal is output, and calculates the first period and the second period on the basis of the number of clocks.

6. The signal transmission and reception system according to claim 5,
   wherein the fixed pattern signal output circuit has a period obtained by multiplying the first period by a constant as the reference period, and
   the signal detection circuit calculates the first period by dividing the number of clocks by the constant.

7. The signal transmission and reception system according to claim 5,
   wherein the fixed pattern signal output circuit further outputs a second fixed pattern signal that is a predetermined fixed pattern signal between the first fixed pattern signal and the encoded signal, and
   a length of a period of the second fixed pattern signal is longer than a period required for the signal detection circuit to calculate the first period and the second period on the basis of the number of clocks.

8. A reception device that receives a transmission signal including an encoded signal in which transmission data is converted into a Manchester code as a switching edge from a transmission device on the basis of a transmission clock, comprising:
   a high-speed clock generation circuit configured to generate a high-speed clock faster than the transmission clock;
   an edge detection circuit configured to detect an edge of the transmission signal on the basis of the high-speed clock; and
   a signal detection circuit configured to detect the edge detected in a period sandwiched between a first elapsed time at which a first period has elapsed from a start point and a second elapsed time at which a second period longer than the first period has elapsed from the start point as the switching edge,
   wherein the signal detection circuit has a first counter and a second counter that operate in synchronization with the high-speed clock, detects the first elapsed time at which the first period has elapsed from the start point using the first counter, and detects the second elapsed time at which the second period has elapsed from the start point using the second counter.

9. The reception device according to claim 8,
   wherein the signal detection circuit detects a next switching edge using the switching edge detected immediately before as the start point.

10. A reception method for receiving a transmission signal including an encoded signal in which transmission data is converted into a Manchester code as a switching edge from a transmission device on the basis of a transmission clock, comprising:

a high-speed clock generation process of generating a high-speed clock faster than the transmission clock;

an edge detection process of detecting an edge of the transmission signal on the basis of the high-speed clock;

a signal detection process of detecting the edge detected in a period sandwiched between a first elapsed time at which a first period has elapsed from a start point and a second elapsed time at which a second period longer than the first period has elapsed from the start point as the switching edge;

a first elapsed time detection process of detecting the first elapsed time at which the first period has elapsed from the start point using a first counter that operates in synchronization with the high-speed clock; and a second elapsed time detection process of detecting the second elapsed time at which the second period has elapsed from the start point using a second counter that operates in synchronization with the high-speed clock.

11. A reception method according to claim 10, wherein a next switching edge is detected with the switching edge detected immediately before as the start point in the signal detection process.

* * * * *